United States Patent [19]

Bumbalough

[11] Patent Number: 4,839,190

[45] Date of Patent: Jun. 13, 1989

[54] SPREADABLE PRODUCT HAVING AND ANHYDROUS MILK FAT COMPONENT

[75] Inventor: John E. Bumbalough, Shoreview, Minn.

[73] Assignee: Wisconsin Milk Marketing Board, Inc., Madison, Wis.

[21] Appl. No.: 42,324

[22] Filed: Apr. 24, 1987

[51] Int. Cl.$^4$ ............................................. A23D 3/00
[52] U.S. Cl. .................................... 426/603; 426/580; 426/613
[58] Field of Search ............... 426/603, 580, 586, 588, 426/613, 608

[56] References Cited

U.S. PATENT DOCUMENTS 3,519,435  7/1970  MacCollom ..................... 426/586
4,005,228  1/1977  Norris ............................ 426/603 X Primary Examiner—Donald E. Czaja
Assistant Examiner—Celine T. Callahan
Attorney, Agent, or Firm—Kinney & Lange

[57] ABSTRACT

A cold spreadable product includes a milk fat component consisting essentially of a stearine fraction obtained at approximately 29.5° C. and an olein fraction obtained at approximately 12.5° C. The product is produced by fractionating anhydrous milk fat to obtain the two fractions, then recombining only the two fractions of interest excluding the other milk fat fractions produced in the fractionating process.

7 Claims, 2 Drawing Sheets

SPREADABLE PRODUCT HAVING AND ANHYDROUS MILK FAT COMPONENT

BACKGROUND OF THE INVENTION

1. Field of the Invention

The present invention relates to a spreadable product and a process for selectively fractionating fat and then recombining selected fat fractions.

2. Description of the Prior Art

Both butter and oleomargarine are typically stored in a refrigerator and often used immediately after being taken from the refrigerator. One distinct advantage that oleomargarine has had over butter is that oleomargarine spreads more easily at refrigeration temperatures than butter.

Some work has been done in attempting to alter spreadability and thermal behavior of butter. As reported in The New Zealand Dairy Research Institute 1975, 1976 and 1977 Reports, milk fat was fractionated and then recombined. It was suggested that the triglyceride fraction which melts at 5° C. to 20° C. in milk fat be largely removed to mimic the spreadability of margarine at refrigeration temperatures.

R. E. Timms describes separating milk fat into three fractions. The high melting fraction includes only long chain saturated acids and has a melting point of greater than 50° C. The middle melting fraction includes two long chain saturated acids plus one short chain or cis-unsaturated acid and has a melting point of 35° C. to 40° C. The low melting fraction has one long chain saturated acid plus two short chain or cis-unsaturated acids and has a melting point of less than 15° C. However, Timms does not recombine any of the fractions but simply provides an analysis of these three fractions.

The Verhagen et al U.S. Pat. No. 4,436,760 describes a low calorie spread that is based on a low-melting butterfat fraction that has an improved spreadability at 10° C. The low-melting butterfat fraction is an olein obtained by dry fractionation of butterfat within the temperature range of 20° C. to 30° C. The low-melting olein fraction is cooled and worked into an emulsion having a pH of 4.0 to 7.0 until a product having a required texture and plasticity is produced.

The Biernoth et al U.S. Pat. No. 4,504,503 describes a process for producing a mixture of triglycerides displaying butter-like properties by fractionating butterfat with a liquified gas or a gas under supercritical conditions. The mixture of triglycerides predominantly consists of triglycerides with a carbon number ranging from 24 to 42 and is used as one of the fat components of a margarine fat blend to improve the margarine's butter-like properties.

SUMMARY OF THE INVENTION

The present invention includes a cold spreadable product having a milk fat component consisting essentially of a stearine fraction obtained at approximately 29.5° C. and an olein fraction obtained at approximately 12.5° C.

The product is produced by a sequential fractionation process wherein a first anhydrous milk fat stream is fractionated at a temperature of approximately 29.5° C. to obtain a 29.5° C. stearine fraction and a 29.5° C. olein fraction. The olein fraction is added to a second anhydrous milk fat stream for fractionating at 18° C. to obtain an 18° C. olein fraction and a 18° C. stearine fraction. The 18° C. olein fraction is then subjected to fractionation at 12.5° C. to obtain a 12.5° C. stearine fraction and a 12.5° C. olein fraction. The 12.5° C. olein fraction is then combined with the 29.5° C. stearine fraction to form the milk fat component of a product that is spreadable at typical refrigeration temperatures.

DETAILED DESCRIPTION OF THE PREFERRED EMBODIMENTS

The present invention includes a cold spreadable product containing a milk fat component that is spreadable at typical refrigeration temperatures. All references to percentage are to percentage by weight, except as otherwise specified. By refrigeration temperatures is meant being spreadable in a temperature range as low as 38° F. to 40° F. The product is also dimensionally stable at room temperature. Preferably, the product has similar spreading characteristics and dimensional stability characteristics as conventional oleomargarine.

The product of the present invention includes a milk fat component that contains a stearine fraction obtained at approximately 29.5° C. and an olein fraction that is obtained in a sequential fractionation, first at 18° C. and then at 12.5° C. The 29.5° C. stearine fraction and the 12.5° C. olein fraction are combined to form the milk fat component of the spreadable product of the present invention.

By stearine fraction is meant that portion of the milk fat that is a solid at the selected fractionation temperature. By olein fraction is meant that fraction of the milk fat that is a liquid at the selected fractionation temperature.

All melting points referred to in the present application were obtained using a capillary tube method defined by the American Oil Chemists Society (AOCS) Official Method Cc 1-25 (reapproved 1973).

Preferably, the fractionation process used in the present invention is a fractional crystallization process. A crystallization fractionation process is referred to in the Verhagen et al U.S. Pat. No. 4,436,760.

The process of the present invention includes a sequential fractionization crystallization process. Initially, a first anhydrous milk fat stream is fractionally crystallized to obtain a high melt stearine fraction for subsequent use as a component in the spreadable product of the present invention at a selected concentration. The olein fraction obtained is blended back with a second anhydrous milk fat stream and fractionally crystallized at a lower temperature. The resulting stearine fraction is removed and discarded. The resulting olein fraction is once again fractionally crystallized at a further lower temperature with the resulting stearine fraction being discarded. The resulting olein fraction is blended with the initial high melt stearine fraction to form the milk fat component of the present invention.

Figure 1:
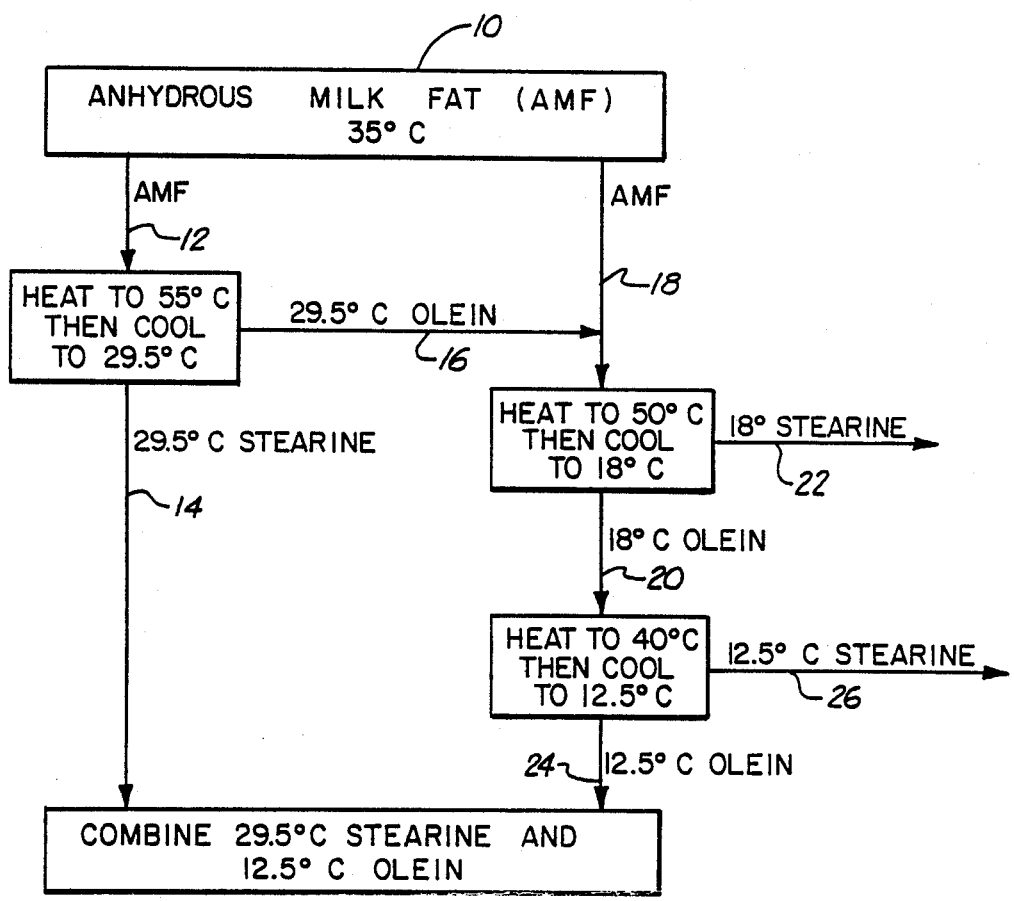
FIG. 1 is a schematic diagram of the fractionation step of the present invention.

Referring to FIG. 1 wherein the fractionation process step of the present invention is diagrammatically illustrated, anhydrous milk fat 10 at preferably 35° C. is used as the source material. By anhydrous milk fat is meant milk fat that is treated to remove all moisture, including traces of moisture, and nonfat milk solids. The milk fat is treated by conventional techniques such as cream separation, centrifugal separation and vacuum polishing to remove traces of moisture. In addition, the anhydrous milk fat is pretreated to remove residual traces of nonfat milk solids. Such nonfat milk solids may act as nucleation sites during the crystallization which might result in different stearine and olein fractions than desired.

A first stream 12 of the anhydrous milk fat is initially heated to approximately 55° C. and then cooled to 29.5° C. over a 12–16 hour cycle. A portion of the milk fat crystallizes upon cooling producing a stearine fraction 14 having a melt point of 42° C. to 43° C. comprising 12% to 18% of the anhydrous milk fat stream. The 29.5° C. stearine fraction is subsequently used to produce the milk fat component of the product of the present invention.

The 29.5° C. olein stream 16 is blended with a second anhydrous milk fat stream 18 which is heated to approximately 50° C. The stream 18 is subsequently cooled to 18° C. over 16–24 hours wherein an 18° C. olein fraction 20 and an 18° C. stearine fraction 22 are produced. The second olein fraction 20 comprises 62% to 72% of the second anhydrous milk fat stream 18 and has a melt point of approximately 17° C. to 19° C. The 18° C. stearine fraction 22 comprises 28% to 38% of the anhydrous milk fat stream 18 and has a melt point of approximately 39° C. to 40° C. The 18° C. stearine stream 22 is not used in the present invention.

The 18° C. olein stream 20 is subjected to a subsequent fractionation. The 18° C. olein stream 20 is heated to approximately 40° C. and cooled to approximately 12.5° C. from 40° C. over 20–30 hours. The stream 20 is fractionally crystallized to form an 12.5° C. olein stream 24 having a melt point of 12° C. to 13° C. and comprising 55% to 60% of the 18° C. olein stream 20, and a 12.5° C. stearine stream 26 having a melt point of 23° C. to 26° C. that comprises 40% to 45% of the 18° C. olein stream 20. The 12.5° C. stearine stream 26 is not used. The 12.5° C. olein stream 24 is then blended with the 29.5° C. stearine stream 14 to form the milk fat component of the product of the present invention.

The present invention includes a range of 4 to 10 parts of the 12.5° C. olein fraction to 1 part of the 29.5° C. stearine fraction. Preferably, 9 parts of the 12.5° C. olein fraction is blended with 1 part of the 29.5° C. stearine fraction.

The 29.5° C. stearine fraction and the 12.5° C. olein fraction are preferably mixed with pasteurized skim milk and salt and standardized to at least an 80.1% fat content to produce a product having a composition the same as butter. Set forth below is a preferred composition range of the product of the present invention:

| | |
| --- | --- |
| 29.5° C. Stearine | 8%–12% |
| 12.5° C. Olein | 68.1%–72.1% |
| Salt | 1.2%–1.6% |
| Skim Milk | 18.3%–18.6% |

The stearine fraction and the olein fraction used in forming the milk fat component of the present invention can be defined by the solid fat index (SFI). SFI is an expression of the ratio of solid fat to liquid fat at a specific temperature and is defined by AOCS Official Method Cd 10-57 (revised 1974). SFI data for the 29.5° C. stearine fraction and the 12.5° C. olein fraction are shown below:

| % SFI | 29.5° C. Stearine | 12.5° C. Olein |
| --- | --- | --- |
| at 10.0° C. | 48.0 | 0 |
| at 21.1° C. | 37.5 | 0 |
| at 26.7° C. | 36.0 | 0 |
| at 33.3° C. | 26.5 | 0 |
| at 40.0° C. | 13.0 | 0 |

The stearine and olein fractions, skim milk and salt are blended in a tank to form an emulsion and heated to 42° C. to 45° C. and agitated thoroughly to mix the components. The mixture is then pumped through a swept-surface heat exchanger such as a Votator and texturized in a manner similar to margarine. The emulsion is cooled to a temperature well below its melting point in the Votator. Nitrogen is incorporated into the emulsion at the entrance of the Votator in a first heat exchanger to prevent oxidation of the milk fat.

Figure 2:
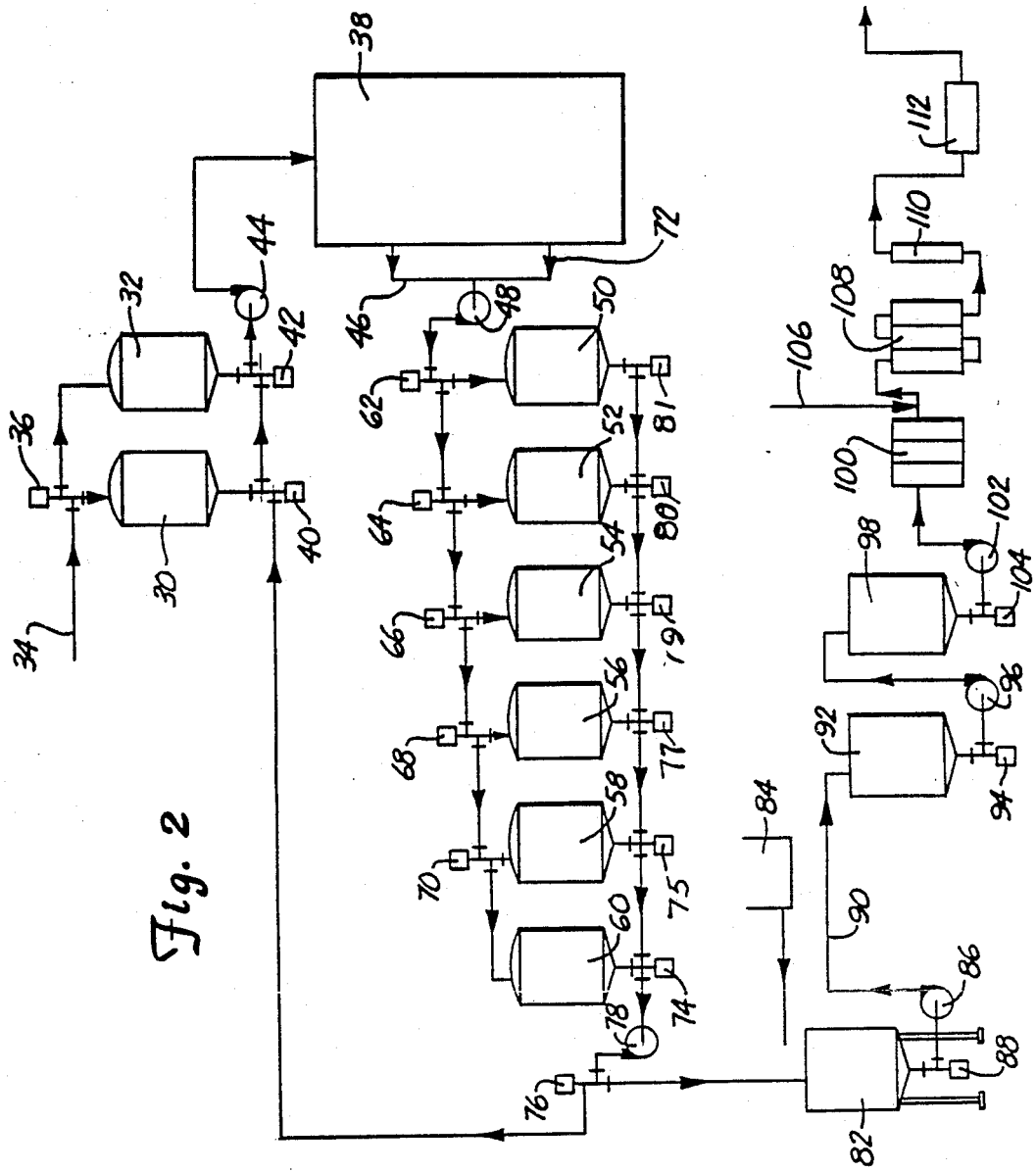
FIG. 2 is a flow diagram of a preferred embodiment of the process of the present invention.

Referring to FIG. 2, a preferred plant arrangement is illustrated in a flow diagram. Anhydrous milk fat is supplied to the plant in bulk and stored in either vessel 30 or 32 through supply line 34 by operation of valve 36. Anhydrous milk fat is supplied to crystallization unit 38 by drawing anhydrous milk fat from either vessel 30 or 32 by operating valves 40 and 42. Pump 44 is used to pump the anhydrous milk fat from either vessel 30 or 32 to the crystallization unit 38.

The crystallizaion unit 38 is a commercially available batch type of crystallization unit. First, anhydrous milk fat is heated to 55° C. and then cooled to 29.5° C. A solid 29.5° C. stearine fraction is separated from a 29.5° C. olein fraction. The olein fraction is conveyed through line 46 by pump 48 and stored in one of storage vessels 50, 52, 54, 56, 58 or 60. It will be appreciated that the 29.5° C. olein fraction is directed to one of the vessels 50, 52, 54, 56, 58 or 60 by operating valves 62, 64, 66, 68 and 70 in a manner that directs the 29.5° C. olein fraction to the chosen vessel.

Next, the 29.5° C. stearine fraction is heated to a liquid state and pumped through supply line 72 by pump 78 to one of the vessels 50, 52, 54, 56, 58 or 60.

From the chosen vessel, the 29.5° C. olein fraction is directed back to the crystallization unit 38 by operation of valves 74, 75, 77, 79, 80 or 81, depending on the chosen vessel, and valves 76, 40 and 42. Pump 78 is used to pump the 29.5° C. olein fraction to the crystallizing unit 38. The 29.5° C. olein fraction is blended with additional anhydrous milk fat from either vessel 30 or 32 as it is pumped to the crystallization unit 38.

In the crystallization unit, the 29.5° C. olein fraction and additional anhydrous milk fat is heated to 50° C. and then cooled to 18° C. to produce an 18° C. olein fraction and an 18° C. stearine fraction. The 18° C. olein fraction is then conveyed from the crystallizing unit 38 through line 46 by pump 48 and through operation of valves 62, 64, 66, 68 and 70, the 18° C. olein fraction is stored in any one of the unoccupied vessels 50, 52, 54, 56, 58 or 60. The 18° C. stearine fraction is heated to a liquid state and pumped through lines 72 by pump 48 into either one of the vessels 50, 52, 54, 56, 58 or 60 through operation of valves 62, 64, 66, 68 or 70.

The 18° C. olein fraction is then pumped from the chosen vessel by operating valves 74, 75, 77, 79, 80 or 81, depending on the chosen vessel, and valves 40 and 42 and using pump 78 to pump the 18° C. olein fraction back to the crystallization unit 38.

The 18° C. olein fraction is then heated to 40° C. and cooled to 12.5° C. to produce a 12.5° C. olein fraction and a 12.5° C. stearine fraction. The 12.5° C. stearine fraction is then pumped by pump 48 through line 46 and by operation of valve 62, 64, 66, 68 or 70 into any unoccupied vessel 50, 52, 54, 56, 58 or 60. The 12.5° C. stearine fraction is heated to a liquid and pumped through line 72 by pump 48 and stored into either vessel 50, 52, 54, 56, 58 or 60 by operation of valves 62, 64, 66, 68 or 70.

To form the product of the present invention, the 29.5° C. stearine fraction and the 12.5° C. olein fraction are drawn from their respective storage vessels into a blending vat 82 in the proportions discussed previously. In addition, salt and skim milk are supplied to the blending vat 82 from vessel 84.

From the blending vat 82, pump 86 and valve 88 are used to pump the blended product through line 90 into a surge tank 92. From the surge tank 92, by operation of valve 94 and pump 96, the blend is stored in supply tank 98 at approximately 110° F.

From the supply tank 98, the blended product is transported to a three-way piston pump 100 by pump 102 through operation of valve 104.

After the three-way piston pump, nitrogen is injected into the product through line 106. The nitrogen is injected into the blended product just prior to the swept-surface heat exchanger 108. In the swept-surface heat exchanger, the product is cooled to approximately 40° F. and transported to aging tube 110. After aging tube 110, the product is further worked by a pin worker 112. After pin worker 112, the product is suitable for use.

The following example is for illustrative purposes only and is not intended to limit the present invention in any way. The example is being submitted in order to illustrate more explicitly the process of the present invention.

EXAMPLE 125 pounds of anhydrous milk fat was washed by first heating anhydrous milk fat to 125° C. and adding 10% by weight of deionized water, agitating the anhydrous milk fat in a vessel and clarifying the anhydrous milk fat by bowl centrifugation at 40 psi. The anhydrous milk fat was fractionated by first heating to approximately 55° C. and then cooling the milk fat to approximately 29.4° C. Approximately 15 pounds of 29.4° C. stearine was obtained and 98 pounds of olein was obtained. 12 pounds was lost due to a spill. Consequently, the yield of 29.4° C. stearine was approximately 12%. The stearine yielded the following SFI profile at the following temperatures:

| % Solids At | SFI |
| --- | --- |
| 50° C. | 47.4 |
| 70° C. | 36.5 |
| 80° C. | 34.9 |
| 92° C. | 25.6 |
| 104° C. | 12.0 |

The capillary melt point for the 29.4° C. stearine fraction was 43.9° C.

Approximately 250 pounds of additional anhydrous milk fat was washed and fractionated at 18° C. to produce an 18° C. olein fraction and an 18° C. stearine fraction. The 18° C. olein fraction was again fractionated at 12.0° C. resulting in 64.8 pounds of 12° C. olein fraction for a net yield of 25.9%.

The 29.4° C. stearine fraction and the 12° C. olein fraction were blended in the following proportions:

| Component | Lbs. |
| --- | --- |
| 12° C. olein | 64 |
| 29.4° C. stearine | 11 |
| Salt | 1.17 |
| Non-fat dry milk | 1.55 |
| Deionized water | 15.78 |
| Total | 93.5 |

The above mixture was heated to 165° F. for 17 seconds and was mixed to blend the components together.

The blended components were then processed through a swept-surface heat exchanger at approximately 46° F. with nitrogen being introduced into the product prior to the swept-surface heat exchanger. After the swept-surface heat exchanger, the product was placed in tubs and permitted to stand at 70° F. for 4 hours and then placed in a refrigeration at 40° F.

The product was found to be spreadable at the refrigeration temperature.

Although the present invention has been described with reference to preferred embodiments, workers skilled in the art will recognize that changes may be made in form and detail without departing from the spirit and scope of the invention.

What is claimed is:

1. A spreadable product having an anhydrous milk fat component consisting essentially of a stearine frction obtained at approximately 29.5° C. and an olein fraction obtained at approximately 12.5° C. wherein the milk fat component includes 4 to 10 parts of the 12.5° C. olein fraction to 1 part of the 29.5° C. stearine fraction to 1 part of the 29.5° C. stearine fraction and the product being free standing without change at room temperature and being spreadable at a temperature as low as approximately 3° C.

2. The product of claim 1 wherein the milk fat component includes approximately 9 parts of the olein fraction to approximately 1 part of the stearine fraction.

3. The product of claim 1 wherein the stearine fraction has a melt point of approximately 42° C.−43° C. and the olein fraction has a melt point of approximately 12° C.−13° C.

4. The product of claim 1 having the approximate composition as follows:

| 29.5° C. Stearine | 8%−12% |
| --- | --- |
| 12.5° C. Olein | 68.1%−72.1% |
| Salt | 1.2%−1.6% |
| Skim Milk | 18.3%−18.6% |

5. A spreadable product having an anhydrous milk fat component consisting essentially of a stearine fraction having a melt point of 42° C.−43° C. and an olein fraction having a melt point of approximately 12° C.−13° C., wherein the milkfat component includes 4−10 parts of the olein fraction to 1 part of the stearine fraction, the product being dimensionally stable at room temperature and being spreadable at a temperature as low as approximately 3° C.

6. The product of claim 5 wherein the milk fat component includes approximately 9 parts of the oleine fraction to approximately 1 part of the stearine fraction.

7. The product of claim 5 having the approximate composition:

| | |
|---|---|
| 29.5° C. Stearine | 8%–12% |
| 12.5° C. Olein | 68.1%–72.1% |
| Salt | 1.2%–1.6% |
| Skim Milk | 18.3%–18.6% |

* * * * *

UNITED STATES PATENT AND TRADEMARK OFFICE
CERTIFICATE OF CORRECTION

PATENT NO. : 4,839,190

DATED : June 13, 1989

INVENTOR(S) : John E. Bumbalough

It is certified that error appears in the above-identified patent and that said Letters Patent is hereby corrected as shown below:

In the Title, line 1, delete "AND", and insert "AN".

In the References Cited Section, add the following patent documents to the U.S. PATENT DOCUMENTS Section:

| | | | |
|---|---|---|---|
| 4,436,760 | 3/1984 | Verhagen, et al | 426/603 |
| 4,504,503 | 3/1985 | Biernoth, et al | 426/312 |

In the OTHER PUBLICATIONS Section, add the following publications/articles:

1975 Annual Report of the New Zealand Dairy Research Institute

1976 Annual Report of the New Zealand Dairy Research Institute

1977 Annual Report of the New Zealand Dairy Research Institute

Timms, R. E., "The Phase Behavior and Polymorphism of Milk Fat, Milk Fat Fractions and Fully Hardened Milk Fat," The Australian Journal of Dairy Technology, pp. 47-53, June 1980

Column 6, line 62, before "olein" insert 12.5 C.

Column 6, line 62, before "stearine", insert 29.5 C.

Signed and Sealed this

Twenty-second Day of May, 1990

Attest:

HARRY F. MANBECK, JR.

Attesting Officer     Commissioner of Patents and Trademarks